(12) United States Patent
Zhang et al.

(10) Patent No.: US 10,728,862 B2
(45) Date of Patent: Jul. 28, 2020

(54) DATA SENDING METHOD AND DEVICE

(71) Applicant: Huawei Technologies Co., Ltd., Shenzhen (CN)

(72) Inventors: Xingwei Zhang, Beijing (CN); Chao Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 88 days.

(21) Appl. No.: 15/965,412

(22) Filed: Apr. 27, 2018

(65) Prior Publication Data
US 2018/0249429 A1  Aug. 30, 2018

Related U.S. Application Data

(63) Continuation of application No. PCT/CN2015/093466, filed on Oct. 30, 2015.

(51) Int. Cl.
| | |
|---|---|
| *H04W 52/38* | (2009.01) |
| *H04W 52/18* | (2009.01) |
| *H04W 52/14* | (2009.01) |
| *H04W 52/24* | (2009.01) |
| *H04W 52/40* | (2009.01) |

(Continued)

(52) U.S. Cl.
CPC ....... *H04W 52/386* (2013.01); *H04W 52/146* (2013.01); *H04W 52/18* (2013.01); *H04W 52/247* (2013.01); *H04W 52/383* (2013.01); *H04W 52/40* (2013.01); *H04W 52/50* (2013.01); *H04W 52/08* (2013.01); *H04W 52/10* (2013.01); *H04W 52/242* (2013.01);

(Continued)

(58) Field of Classification Search
None
See application file for complete search history.

(56) References Cited

U.S. PATENT DOCUMENTS

| | | | |
|---|---|---|---|
| 7,933,293 | B2 | 4/2011 | Wentink |
| 2008/0069033 | A1 | 3/2008 | Li et al. |

(Continued)

FOREIGN PATENT DOCUMENTS

| | | |
|---|---|---|
| CN | 101132203 A | 2/2008 |
| CN | 101340213 A | 1/2009 |

(Continued)

OTHER PUBLICATIONS

"On Remaining Details of Power Control," Intel Corporation, 3GPP TSG RAN WG1 Meeting #79, R1-144653, 6.2.1.5, Nov. 17-21, 2014, 4 pages, San Francisco, USA.

(Continued)

*Primary Examiner* — Fayyaz Alam
(74) *Attorney, Agent, or Firm* — Slater Matsil, LLP

(57) ABSTRACT

An embodiment method includes: obtaining, by a first device, at least one parameter used to determine transmit power; determining, by the first device, the transmit power according to the at least one parameter; and sending, by the first device, data by using the determined transmit power. The at least one parameter includes at least one of the following parameters: a resource pool used for data transmission, a type of a to-be-sent message or service, a transmit interval or a transmit frequency of a to-be-sent message or service, a size of a message packet, a priority of a to-be-sent message or service, an ID of a to-be-sent message or service.

9 Claims, 5 Drawing Sheets

(51) Int. Cl.
*H04W 52/50* (2009.01)
*H04W 52/28* (2009.01)
*H04W 52/32* (2009.01)
*H04W 52/36* (2009.01)
*H04W 52/10* (2009.01)
*H04W 52/08* (2009.01)

(52) U.S. Cl.
CPC ........ *H04W 52/246* (2013.01); *H04W 52/281* (2013.01); *H04W 52/325* (2013.01); *H04W 52/367* (2013.01)

(56) References Cited

U.S. PATENT DOCUMENTS

| | | | |
|---|---|---|---|
| 2014/0066119 A1* | 3/2014 | Tavildar | H04W 52/46 455/522 |
| 2014/0274196 A1* | 9/2014 | Dai | H04W 52/242 455/522 |
| 2016/0295595 A1 | 10/2016 | Chae et al. | |
| 2017/0048807 A1 | 2/2017 | Wang et al. | |
| 2017/0142741 A1* | 5/2017 | Kaur | H04W 56/002 |

FOREIGN PATENT DOCUMENTS

| | | |
|---|---|---|
| CN | 103139889 A | 6/2013 |
| CN | 104113832 A | 10/2014 |
| CN | 104202821 A | 12/2014 |
| CN | 104509180 A | 4/2015 |
| JP | 2010034612 A | 2/2010 |
| JP | 2012157022 A | 8/2012 |
| JP | 2016539532 A | 12/2016 |
| WO | 2015050394 A1 | 4/2015 |

OTHER PUBLICATIONS

"3rd Generation Partnership Project; Technical Specification Group Radio Access Network; Evolved Universal Terrestriai Radio Access (E-UTRA); Physical layer procedures (Release 10)," 3GPP TS 36.213, V10.11.0, Dec. 16, 2013, 127 pages.

"Discussion on inter-modulation issue for clustered PUSCH transmission," Panasonic, 3GPP TSG-RAN WG1 Meeting #62, R1-104894, 6.2.6 Pusch Resource allocation, Aug. 23-27, 2010, 9 pages, Madrid, Spain.

"eIMTA PHR," InterDigital Communications, 3GPP TSG-RAN WG2 #84, Tdoc R2-134230, 7.8.2, Nov. 11-15, 2013, 4 pages, San Francisco, US.

"3GPP TS 36.213 V12.7.0 3rd Generation Partnership Project;Technical Specification Group Radio Access Network; Evolved Universal Terrestrial Radio Access (E-UTRA);Physical layer procedures(Release 12), Technical Specification, Sep. 2015, 241 pages".

3GPP TS 36.331 V12.7.0 3rd Generation Partnership Project;Technical Specification Group Radio Access Network; Evolved Universal Terrestrial Radio Access (E-UTRA);Radio Resource Control (RRC); Protocol specification(Release 12),Technical Specification, Sep. 2015, 453 pages.

Samsung, eD2D power control in a non-serving carrier. 3GPP TSG RAN WG1 Meeting #82 Beijing, China, Aug. 24-28, 2015, R1-154130, 2 pages.

Panasonic, "D2D Synchronization Procedure," 3GPP TSG RAN WG1 Meeting #78, R1-144104, Oct. 6-10, 2014, 3 pages, Ljubljana, Slovenia.

Intel Corporation, "Further Discussion of Layer 2 Parameter Configuration for ProSe Communication," 3GPP TSG-RAN WG2 Meeting #87, R2-143222, Aug. 18-22, 2014, 4 pages, Dresden, Germany.

NTI Docomo "SRS power-control for dual connectivity", 3GPP Draft; R1-143225, France, vol. RAN WG1, No. Dresden, Germany; Aug. 17, 2014 (Aug. 17, 2014), XP050788702.

Qualcomm Incorporated "Power scaling in power limited cases", 3GPP Draft; R1-102749 France, vol. RAN WG1, No. Montreal, Canada; May 10, 2010, May 4, 2010(May 4, 2010), XP050419942.

* cited by examiner

DATA SENDING METHOD AND DEVICE

CROSS-REFERENCE TO RELATED APPLICATIONS

This application is a continuation of International Application No. PCT/CN2015/093466, filed on Oct. 30, 2015, the disclosure of which is hereby incorporated by reference in its entirety.

TECHNICAL FIELD

This application relates to the field of communications technologies, and in particular, to a data sending method and device.

BACKGROUND

The Long Term Evolution-Advanced (LTE-A) Rel-10/11/12/13/14 versions of the 3rd Generation Partnership Project (3GPP) are enhancements of the LTE Rel-8/9 versions. An LTE-A system has a higher bandwidth requirement than an LTE system, and supports a peak data rate of up to 1 G/s in a downlink and 500 M/s in an uplink. To meet a requirement of LTE-A, a carrier aggregation (CA) technology is used as a method for extending system bandwidth for the LTE-A system. In addition, a multi-antenna enhancement technology, that is, multiple-input multiple-output (MIMO), and a coordinated multipoint (CoMP) technology are used to improve a data rate and system performance.

With rapid development of wireless communications and emergence of ultra-high-rate services (such as high-definition videos), the load of a wireless communications network becomes heavier despite various technologies used in the LTE-A system to improve data rate. Thus, reducing the load of the network has become a research focus. Device-to-device (D2D) communication emerges accordingly, and becomes a key project of the LTE-A Rel-12/13 versions. In this direct device connection and communication mode, terminals may directly communicate with each other without forwarding by an eNB, thereby sharing data load of the eNB. D2D communication can better utilize a spectrum resource, and improves spectrum utilization and a data rate while reducing load of the eNB.

To improve spectrum utilization and make the most of a radio frequency capability of an existing terminal, multiplexing of a spectrum resource of an existing mobile communications network is considered for a D2D communication link (also referred to as a sidelink (SL)). To avoid interfering with a terminal in the existing network, downlink (e.g., a link from an eNB to UE) spectrum resources in LTE-A is not used in D2D communication. Instead, uplink (e.g., a link from the UE to the eNB) spectrum resources in the LTE-A system are multiplexed because interference immunity of an eNB is generally stronger than that of a typical UE. A D2D device is more likely to multiplex the uplink spectrum resource in a time division manner. In this way, simultaneous receiving and sending do not need to be supported, and only sending or receiving needs to be performed at a moment.

In a power control mechanism in the current system, transmit power of a mobile device is associated with a moving speed of the mobile device. Different moving speeds correspond to different transmit powers. A higher moving speed of the mobile device corresponds to a larger transmit power of the mobile device. A lower moving speed of the mobile device corresponds to a smaller transmit power of the mobile device. Determined transmit power is inappropriate because only impact of the moving speed on the transmit power is considered when the transmit power is determined. When transmitting data using the transmit power, the mobile device may interfere with another nearby mobile device. For example, if a mobile device (such as UE or a vehicle) with a relatively high moving speed uses relatively large transmit power when sending non-emergency data, another nearby mobile device that has a relatively low moving speed but needs to send an emergency data service is interfered with. For another example, it is also inappropriate if a mobile device with a relatively low moving speed uses a relatively small transmit power when sending emergency data. Consequently, a receive end may fail to receive the sent emergency data.

SUMMARY

Embodiments of this application provide a data sending method and device, so as to resolve a problem in the prior art that determined transmit power is inappropriate.

According to a first aspect, a data sending method is provided. The method includes obtaining, by a first device, at least one parameter used to determine transmit power. The method further includes determining, by the first device, the transmit power according to the at least one parameter. The method further includes sending, by the first device, data by using the transmit power. The at least one parameter includes at least one of the following parameters: a resource pool used for data transmission, a type of a to-be-sent message or service, a transmit interval or a transmit frequency of a to-be-sent message or service, a size of a message packet, a priority of a to-be-sent message or service, an identity ID of a to-be-sent message or service, an ID of a transmit end, an ID of a receive end, a type of a transmit end, or a type of a receive end.

In a possible implementation, the determining, by the first device, the transmit power according to the at least one parameter includes: determining, by the first device according to the at least one parameter, a first transmit power parameter corresponding to the at least one parameter; and determining, by the first device, the transmit power according to the first transmit power parameter.

In a possible implementation, the obtaining, by a first device, at least one parameter used to determine transmit power of the first device includes: obtaining, by the first device, the at least one parameter by means of configuration by a base station; obtaining, by the first device, the at least one parameter by using a signal sent by a second device; obtaining, by the first device, the at least one parameter by using a signal sent by a synchronization source; or obtaining, by the first device, the at least one parameter by means of preconfiguration.

In a possible implementation, the first transmit power parameter includes at least one of the following parameters: an open-loop power control parameter, a path loss compensation coefficient, a path loss, maximum transmit power, or a power compensation value.

In a possible implementation, the determining, by the first device, the transmit power according to the first transmit power parameter includes: determining, by the first device, the transmit power according to the first transmit power parameter and a second transmit power parameter, where the second transmit power parameter includes a parameter except the first transmit power parameter in parameters that are used to calculate the transmit power.

In a possible implementation, the method further includes: obtaining, by the first device, the second transmit power parameter by means of configuration by the base station; obtaining, by the first device, the second transmit power parameter by using a signal sent by the second device; obtaining, by the first device, the second transmit power parameter by using a signal sent by the synchronization source; or obtaining, by the first device, the second transmit power parameter by means of preconfiguration.

In a possible implementation, the method further includes: determining, by the first device, a path loss between the first device and a specified device. The determining, by the first device, the transmit power according to the first transmit power parameter further includes: determining, by the first device, the transmit power according to the path loss.

In a possible implementation, the specified device includes: the synchronization source; user equipment UE that is closest to the first device and is in network coverage; UE that is farthest from the first device and is in network coverage; UE that has a smallest signal measurement value in network coverage; UE that has a largest signal measurement value in network coverage; UE that has a smallest signal measurement value in UE whose signal measurement value falls within a specified threshold range in network coverage; UE that has a largest signal measurement value in UE whose signal measurement value falls within a specified threshold range in network coverage; UE, in a neighboring device of the first device, that is farthest from the first device and supports a device-to-device D2D function; UE that is closest to the first device and supports a D2D function; UE that has a largest signal measurement value and supports a D2D function; UE that has a smallest signal measurement value and supports a D2D function; UE that supports a D2D function and has a largest signal measurement value in UE, in a neighboring device of the first device, whose signal measurement value falls within a specified threshold range; UE that supports a D2D function and has a smallest signal measurement value in UE, in a neighboring device of the first device, whose signal measurement value falls within a specified threshold range; UE, in a neighboring device of the first device, that is farthest from the first device and supports an Internet of Vehicles function; UE that is closest to the first device and supports an Internet of Vehicles function; UE that has a largest signal measurement value and supports an Internet of Vehicles function; UE that has a smallest signal measurement value and supports an Internet of Vehicles function; UE that supports an Internet of Vehicles function and has a largest signal measurement value in UE whose signal measurement value falls within a specified threshold range; UE that supports an Internet of Vehicles function and has a smallest signal measurement value in UE whose signal measurement value falls within a specified threshold range; a roadside unit RSU closest to the first device, or an RSU farthest from the first device; an RSU that has a smallest signal measurement value, or an RSU that has a largest signal measurement value; an RSU that has a smallest signal measurement value in an RSU whose signal measurement value falls within a specified threshold range; an RSU that has a largest signal measurement value in an RSU whose signal measurement value falls within a specified threshold range; a mobile terminal closest to the first device; a mobile terminal farthest from the first device in a neighboring device of the first device; a mobile terminal that has a smallest signal measurement value; a mobile terminal that has a largest signal measurement value; a mobile terminal that has a smallest signal measurement value in a mobile terminal whose signal measurement value falls within a specified threshold range; or a mobile terminal that has a largest signal measurement value in a mobile terminal whose signal measurement value falls within a specified threshold range.

In another possible implementation, the specified device is a communications device specified by the base station.

In still another possible implementation, the specified device is a communications device determined by the first device according to a predefined rule.

In a possible implementation, the signal measurement value includes at least one of reference signal received power RSRP, reference signal received quality RSRQ, a received signal strength indicator RSSI, a signal to interference plus noise ratio SINR, or a channel quality indicator CQI.

Based on any one of the foregoing embodiments, in a possible implementation, the data sent by the first device includes at least one of control signaling, service data, a reference signal, a broadcast signal, or a synchronization signal.

In this embodiment, when determining the transmit power of the first device, the first device considers at least one parameter that affects the transmit power, and determines the transmit power of the first device according to the at least one parameter used to determine the transit power. Because impact of another factor on the transmit power is considered, the determined transmit power is more appropriate.

According to a second aspect, a data sending method is provided. The method includes determining, by a first device, a path loss between the first device and a specified device. The method further includes determining transmit power of the first device according to the path loss. The method further includes sending, by the first device, data by using the transmit power.

For details about the specified device and the data sent by the first device, refer to related descriptions in the first aspect.

In this embodiment, the first device determines the path loss between the first device and the specified device, and determines the transmit power of the first device according to the path loss. Because the path loss is the path loss between the first device and the specified device, the transmit power determined based on the path loss is more appropriate.

According to a third aspect, a data sending method is provided. The method includes: determining, by a first device, a priority of to-be-sent data. The method further includes determining, by the first device, that the priority of the to-be-sent data is higher than or equal to a specified priority threshold. The method further includes sending, by the first device, the to-be-sent data by using maximum transmit power or a maximum quantity of transmit times that can be used by the first device.

In a possible implementation, the to-be-sent data is data of the first device or data that is sent by a second device and that is received by the first device.

In a possible implementation, the sending, by the first device, the to-be-sent data further includes when the first device determines that a forwarding hop count of the received data sent by the second device is less than or equal to a specified first threshold, forwarding, by the first device, the received data sent by the second device; and/or when the first device determines that a quantity of processes that are currently processed in parallel by the first device is less than or equal to a specified second threshold, forwarding, by the first device, the received data sent by the second device.

In a possible implementation, after the determining, by a first device, a priority of to-be-sent data, the method further includes: determining, by the first device, that the priority of the to-be-sent data is lower than the priority threshold; and sending, by the first device, the to-be-sent data by using transmit power less than the maximum transmit power of the first device or by using a quantity of transmit times less than the maximum quantity of transmit times.

In this embodiment, after determining that the priority of the to-be-sent data is higher than or equal to the specified priority threshold, the first device sends the to-be-sent data by using the maximum transmit power or the maximum quantity of transmit times that can be used by the first device. Because the first device always uses the maximum transmit power or the maximum quantity of transmit times when sending an emergency service, sending of a service with a highest priority is ensured.

According to a fourth aspect, a data sending device is provided. The device includes: an obtaining module, configured to obtain at least one parameter used to determine transmit power; a determining module, configured to determine the transmit power according to the at least one parameter; and a sending module, configured to send data by using the transmit power.

The at least one parameter includes at least one of the following parameters: a resource pool used for data transmission, a type of a to-be-sent message or service, a transmit interval or a transmit frequency of a to-be-sent message or service, a size of a message packet, a priority of a to-be-sent message or service, an identity ID of a to-be-sent message or service, an ID of a transmit end, an ID of a receive end, a type of a transmit end, or a type of a receive end.

In a possible implementation, the determining module determines, according to the at least one parameter, a first transmit power parameter corresponding to the at least one parameter, and determines the transmit power according to the first transmit power parameter.

For details about the first transmit power parameter, refer to related descriptions in the first aspect.

In a possible implementation, the obtaining module obtains the at least one parameter by means of configuration by a base station, or obtains the at least one parameter by using a signal sent by a second device, or obtains the at least one parameter by using a signal sent by a synchronization source, or obtains the at least one parameter by means of preconfiguration.

In a possible implementation, the determining module determines the transmit power according to the first transmit power parameter and a second transmit power parameter, where the second transmit power parameter includes a parameter except the first transmit power parameter in parameters that are used to calculate the transmit power.

In a possible implementation, the obtaining module obtains the second transmit power parameter by means of configuration by the base station; or obtains the second transmit power parameter by using a signal sent by the second device; or obtains the second transmit power parameter by using a signal sent by the synchronization source; or obtains the second transmit power parameter by means of preconfiguration.

In a possible implementation, before determining the transmit power, the determining module determines a path loss between the first device to which the determining module belongs and a specified device. When determining the transmit power, the determining module determines the transmit power according to the first transmit power parameter and the path loss.

For details about the specified device and the data sent by the first device, refer to related descriptions in the first aspect.

In this embodiment, when determining the transmit power of the first device to which the determining module belongs, the determining module considers at least one parameter that affects the transmit power, and determines the transmit power of the first device according to the at least one parameter used to determine the transit power. Because impact of another factor on the transmit power is considered, the determined transmit power is more appropriate.

According to a fifth aspect, a data sending device is provided. The device includes a determining module, configured to: determine a path loss between the first device to which the determining module belongs and a specified device, and determine transmit power of the first device according to the path loss. The device further includes a sending module, configured to send data by using the transmit power by the first device.

For details about the specified device and the data sent by the first device, refer to related descriptions in the first aspect.

In this embodiment, when determining the transmit power of the first device to which the determining module belongs, the determining module first determines the path loss between the first device and the specified device, and determines the transmit power of the first device according to the path loss. Because the path loss is the path loss between the first device and the specified device, the transmit power determined based on the path loss is more appropriate.

According to a sixth aspect, a data sending device is provided. The device includes a first determining module, configured to determine a priority of to-be-sent data. The device further includes a second determining module, configured to determine that the priority of the to-be-sent data is higher than or equal to a specified priority threshold. The device further includes a sending module, configured to send the to-be-sent data by using maximum transmit power or a maximum quantity of transmit times that can be used by the first device.

In a possible implementation, the to-be-sent data is data of the first device or data that is sent by a second device and that is received by the first device.

In a possible implementation, when determining that a forwarding hop count of the received data sent by the second device is less than or equal to a specified first threshold, the second determining module controls the sending module to forward the received data sent by the second device; and/or when determining that a quantity of processes that are currently processed in parallel by the first device is less than or equal to a specified second threshold, the second determining module controls the sending module to forward the received data sent by the second device.

In a possible implementation, the second determining module determines that the priority of the to-be-sent data is lower than the priority threshold, and controls the sending module to send the to-be-sent data by using transmit power less than the maximum transmit power of the first device or by using a quantity of transmit times less than the maximum quantity of transmit times.

In this embodiment, after determining that the priority of the to-be-sent data is higher than or equal to the specified priority threshold, the second determining module controls the sending module to send the to-be-sent data by using the maximum transmit power or the maximum quantity of transmit times that can be used by the first device. Because the first device always uses the maximum transmit power or the maximum quantity of transmit times when sending an emergency service, sending of a service with a highest priority is ensured.

According to a seventh aspect, a data sending device is provided, including a processor, a memory, and a transmitter. The processor reads a program in the memory, to implement functions of the obtaining module and the determining module in the fourth aspect. The transmitter implements, under control of the processor, a function of the sending module in the fourth aspect.

In this embodiment, when determining transmit power of the first device to which the processor belongs, the processor considers at least one parameter that affects the transmit power, and determines the transmit power of the first device according to the at least one parameter used to determine the transit power. Because impact of another factor on the transmit power is considered, the determined transmit power is more appropriate.

According to an eighth aspect, a data sending device is provided, including a processor, a memory, and a transmitter. The processor reads a program in the memory, to implement functions of the obtaining module and the determining module in the fifth aspect. The transmitter implements, under control of the processor, a function of the sending module in the fifth aspect.

In this embodiment, when determining transmit power of the first device to which the processor belongs, the processor first determines a path loss between the first device and a specified device, and determines the transmit power of the first device according to the path loss. Because the path loss is the path loss between the first device and the specified device, the transmit power determined based on the path loss is more appropriate.

According to a ninth aspect, a data sending device is provided, including a processor, a memory, and a transmitter. The processor reads a program in the memory, to implement functions of the first determining module and the second determining module in the sixth aspect. The transmitter implements, under control of the processor, a function of the sending module in the sixth aspect.

In this embodiment, after determining that a priority of to-be-sent data is higher than or equal to a specified priority threshold, the processor controls a sending module to send the to-be-sent data by using maximum transmit power or a maximum quantity of transmit times that can be used by the first device. Because the first device always uses the maximum transmit power or the maximum quantity of transmit times when sending an emergency service, sending of a service with a highest priority is ensured.

DETAILED DESCRIPTION

The following further describes the embodiments of this application in detail with reference to the accompanying drawings of this specification. It should be understood that the embodiments described herein are merely used to explain this application but are not intended to limit this application.

Embodiment 1

Figure 1:
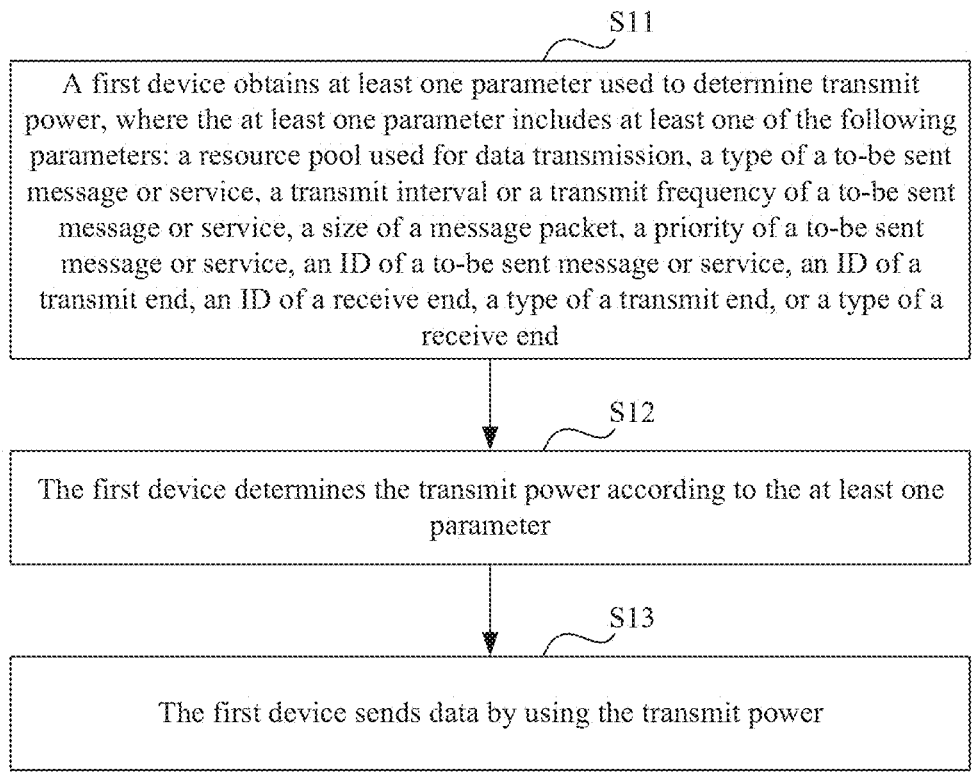
FIG. 1 is a schematic flowchart of a first data sending method according to an embodiment of this application.

This embodiment provides a data sending method. As shown in FIG. 1, the method includes the following steps.

Step S11. A first device obtains at least one parameter used to determine transmit power.

Step S12. The first device determines the transmit power according to the at least one parameter.

Step S13. The first device sends data by using the transmit power.

The at least one parameter includes at least one of the following parameters: a resource pool used for data transmission, a type of a to-be-sent message or service, a transmit interval or a transmit frequency of a to-be-sent message or service, a size of a message packet, a priority of a to-be-sent message or service, an identity ID of a to-be-sent message or service, an ID of a transmit end, an ID of a receive end, a type of a transmit end, or a type of a receive end.

In this embodiment, when determining the transmit power of the first device, the first device considers at least one parameter that affects the transmit power, and determines the transmit power of the first device according to the at least one parameter used to determine the transit power. Because impact of another factor on the transmit power is considered, the determined transmit power is more appropriate for sending data.

In this embodiment, different parameters correspond to different transmit powers. Alternatively, different parameters correspond to different first transmit power parameters (also referred to as power control parameters).

Optionally, the first device determining the transmit power according to the at least one parameter includes: determining, by the first device according to the at least one parameter, a first transmit power parameter corresponding to the at least one parameter; and determining, by the first device, the transmit power according to the first transmit power parameter.

For example, if different parameters correspond to different transmit powers, after obtaining the at least one parameter, the first device may directly determine, according to a correspondence between the at least one parameter and transmit power, the transmit power corresponding to the at least one parameter. If different parameters correspond to different first transmit power parameters, after obtaining the at least one parameter, the first device first determines, according to a correspondence between the at least one parameter and a first transmit power parameter, the first transmit power parameter corresponding to the at least one parameter, and then determines the transmit power according to the first transmit power parameter.

D2D communication is classified into two types: D2D device discovery and D2D device communication. D2D device discovery means that a discovery signal is sent (e.g., on a physical sidelink discovery channel (PSDCH)). D2D device communication means that control signaling (that is, scheduling assignment (SA) that has different sidelink control information (SCI) formats and is carried on a physical sidelink control channel (PSCCH)) and data (carried on a physical sidelink shared channel (PSSCH)) are sent. Relative to an uplink (UL) and a downlink (DL) in LTE, a D2D communication link is referred to as a sidelink (SL). From a sending user aspect, there are currently two modes for allocating resources for D2D device communication. Mode 1 is a centralized control method. A D2D resource is allocated by a central control device, such as a base station or a relay station. The resource is allocated, by means of scheduling, to a sending D2D device for use. Centralized control-based resource allocation is mainly specific to an in-coverage scenario. Mode 2 is a contention-based distributed resource multiplexing method. A sending D2D device obtains a sending resource from a resource pool by means of contention. In an in-coverage scenario, the resource pool is a whole block of resources that is obtained by means of division by a base station, and all D2D devices contend for small blocks of resources of the resource pool (e.g., the whole block of resources). In an out-of-coverage scenario, the resource pool is a block of predefined system bandwidth that can be obtained by D2D devices, and all the D2D devices contend for a resource of the predefined resources.

During implementation, for determining of the transmit power according to the first transmit power parameter or according to a first transmit power and a second transmit power, refer to a power control formula in a D2D system. A physical sidelink shared channel (PSSCH) is used as an example for description. Power control formulae of other channels are similar to that of the physical sidelink shared channel, and are not enumerated one by one herein for description.

For the mode 1, when a power control command (transmit power command, TPC) is set to o, $P_{PSSCH}=P_{CMAX,PSSCH}$ [dBm]. When a power control command is set to 1, $P_{PSSCH}=\min\{P_{CMAX,PSSCH}, 10\log_{10}(M_{PSSCH})+P_{O\_PSSCH,1}+\alpha_{PSSCH,1}\cdot PL\}$ [dBm]. $P_{PSSCH}$ indicates transmit power of the PSSCH channel, $P_{CMAX,PSSCH}$ indicates maximum allowed transmit power of the PSSCH, $M_{PSSCH}$ indicates bandwidth of the PSSCH channel, $P_{O\_PSSCH,1}$ indicates an open-loop power control parameter of the PSSCH channel and corresponding to the mode 1, PL indicates a path loss, and $\alpha_{PSSCH,1}$ indicates a path loss compensation factor corresponding to the mode 1.

For the mode 2, $P_{PSSCH}=\min\{P_{CMAX,PSSCH}, 10\log_{10}(M_{PSSCH})+P_{O\_PSSCH,2}+\alpha_{PSSCH,2}\cdot PL\}$ [dBm]. $P_{PSSCH}$ indicates transmit power of the PSSCH channel, $P_{CMAX,PSSCH}$ indicates maximum allowed transmit power of the PSSCH, $M_{PSSCH}$ indicates bandwidth of the PSSCH channel, $P_{O\_PSSCH,2}$ indicates an open-loop power control parameter of the PSSCH channel and corresponding to the mode 2, PL indicates a path loss, and $\alpha_{PSSCH,2}$ indicates a path loss compensation factor corresponding to the mode 2.

Maximum allowed transmit power of the first device is calculated by using the following formula:

$$P_{CMAX\_L} \le P_{CMAX} \le P_{CMAX\_H}, \text{ where}$$

$P_{CMAX\_H}=\min\{P_{EMAX}, P_{PowerClass}\}$, where $P_{EMAX}$ indicates maximum transmit power that is configured by a system and that is not allowed to be exceeded, and $P_{PowerClass}$ indicates a maximum power transmission capability; and $$P_{CMAX\_L}=\min\{P_{EMAX}-\Delta T_C, P_{PowerClass}-\max(MPR+A-MPR,P-MPR)-\Delta T_C\},$$

where MPR is maximum power reduction, A-MPR (Additional MPR) indicates additional maximum power reduction, P-MPR (Power Management MPR) indicates maximum power reduction based on power management, and $\Delta T_C$ indicates power compensation, where a value of $\Delta T_C$ is usually 1.5 dB or 0 dB.

A difference between D2D power control and an uplink power control mechanism in an LTE system lies in the following:

In D2D power control, each channel has $P_O$ (an open-loop power control parameter of the channel) and α (a path loss compensation factor), and each resource allocation mode has $P_O$ and α. For example, the mode 1 is corresponding to $P_{O\_PSSCH,1}$ and $\alpha_{PSSCH,1}$ and the mode 2 is corresponding to $P_{O\_PSSCH,2}$ and $\alpha_{PSSCH,2}$. In D2D, a path loss between UE and a base station is used as path loss compensation of the UE on a sidelink (SL). In D2D, a compensation factor $\Delta T_{ProSe}$ is added when a lower limit $P_{CMAX\_L}$ of the maximum transmit power $P_{CMAX}$ is calculated, and $P_{EMAX}$ is independently configured.

The following describes each of the possible at least one parameter in detail.

1. The resource pool used for data transmission may be different types of resource pools, such as an SA resource pool, a data resource pool, or a discovery resource pool; or may be different resource pools in a same type of resource pool, such as different SA resource pools (currently, there are a maximum of four different SA resource pools), different data resource pools (currently, there are a maximum of four different data resource pools), or different discovery resource pools (currently, there are a maximum of four different discovery resource pools).

If the at least one parameter is the resource pool used for data transmission, different resource pools may correspond to different transmit power or different first transmit power parameters. In this embodiment of this application, different resource pools correspond to different transmit power or different first transmit power parameters. Therefore, in an example in which different resource pools correspond to different first transmit power parameters, when a resource allocation mode of the mode 2 is used, before selecting a resource, UE may first select a resource pool according to sent data and according to the scheme that different resource pools correspond to different first transmit power parameters, and then select a resource from the resource pool. For example, when the UE sends an emergency service, the UE may send the emergency service by using a resource in a resource pool corresponding to a relatively large transmit power.

2. The type of the to-be-sent message or service includes: (i) whether the service is a safety-related service, including a safety-related service and a non-safety-related service; (2) whether the message or the service is periodically-triggered or event-triggered; (3) a cooperative awareness message (CAM) or a decentralized environment notification message (DENM); (4) different specific messages such as a forward collision warning (FCW), a control loss warning (CLW), an emergency vehicle warning (EVW), ES (Emergency Stop), cooperative adaptive cruise control (CACC), a queue warning (QW), a wrong way driving warning (WWDW), a pre-crash sensing warning (PSW), a curve speed warning (CSW), a warning to pedestrian against pedestrian collision (Warning to Pedestrian against Pedestrian Collision), and vulnerable road user (VRU) safety.

If the at least one parameter is the type of the to-be-sent message or service, different types of to-be-sent messages or services correspond to different transmit power or different first transmit power parameters.

3. If the at least one parameter is the transmit interval or the transmit frequency of the to-be-sent message or service, different transmit intervals correspond to different transmit power or different first transmit power parameters, or different transmit frequencies correspond to different transmit power or different first transmit power parameters. The transmit interval indicates an interval between two times of sending. For example, a value of the transmit interval is 40 ms, 160 ms, or 320 ms. The transmit frequency indicates a quantity of times of sending a message in a time. For example, a value of the transmit frequency is twice/40 ms or four times/40 ms.

4. If the at least one parameter is the size of the message packet, different sizes of the message packet correspond to different transmit power or different first transmit power parameters. The size of the message packet is represented by a quantity of bits of data that needs to be sent. The size of the message packet may be the quantity of bits of the data that needs to be sent, or may be a range.

5. If the at least one parameter is the priority of the to-be-sent message or service, different priorities of the to-be-sent message or service correspond to different transmit power or different first transmit power parameters. For example, service data is classified into eight priorities, and each priority is corresponding to a different first transmit power parameter.

6. If the at least one parameter is the ID of the to-be-sent message or service, IDs of different messages or services correspond to different transmit power or different first transmit power parameters. The IDs of the messages or services are IDs used to identify the different messages/services.

7. If the at least one parameter is the ID of the transmit end, IDs of different transmit ends correspond to different transmit power or different first transmit power parameters. The IDs of the transmit ends are IDs used to identify the different transmit ends.

8. If the at least one parameter is the ID of the receive end, IDs of different receive ends correspond to different transmit power or different first transmit power parameters. The IDs of the receive ends are IDs used to identify the different receive ends.

It should be noted that an ID in SA (that is, an ID field carried in SA) is used to indicate related information of data. Therefore, if the first transmit power parameter is associated with an SA ID, the first transmit power parameter may be used for power control of data only on a physical sidelink shared channel (PSSCH).

9. The transmit end may be at least one of the following: a pedestrian-handheld mobile terminal corresponding to vehicle-to-pedestrian communication (V2P), a vehicle-type terminal corresponding to vehicle-to-vehicle communication (V2V), a roadside unit (RSU) corresponding to vehicle-to-infrastructure communication (V2I), or a base station/network corresponding to vehicle-to-network/base station communication (V2N). If the at least one parameter is the type of the transmit end, types of different transmit ends correspond to different transmit power or different first transmit power parameters.

10. The receive end may be at least one of the following: a pedestrian-handheld mobile terminal, a vehicle-type terminal, an RSU, or a base station/network. If the at least one parameter is the type of the receive end, types of different receive ends correspond to different transmit power or different first transmit power parameters.

It should be noted that if the at least one parameter includes at least two of the foregoing parameters, different combinations of the parameters correspond to different transmit power or different first transmit power parameters. For example, if the at least one parameter includes the resource pool used for data transmission and the type of the to-be-sent message or service, combinations of different resource pools and different message or service types correspond to different transmit power or different first transmit power parameters.

Optionally, in S11, the first device obtains the at least one parameter that affects the transmit power of the first device in the following four optional manners.

Manner 1: The first device obtains the at least one parameter by means of configuration by a base station.

For example, the base station configures the at least one parameter that affects the transmit power, and sends, by means of broadcast, the at least one parameter to a communications device in network coverage. Preferably, this manner is applicable to a scenario in which the first device is a communications device in network coverage.

Figure 2:
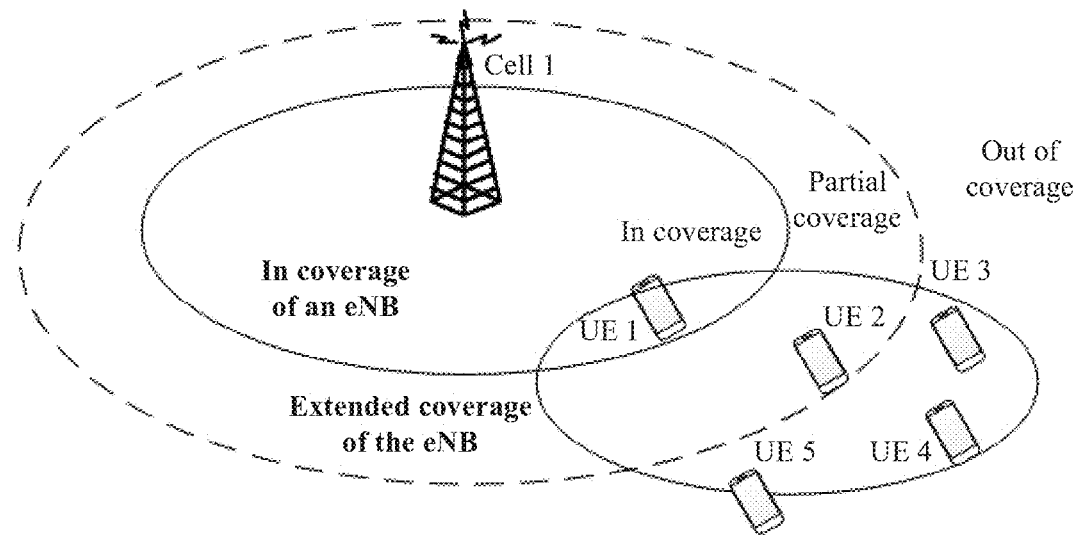
FIG. 2 is a schematic diagram of D2D communication according to an embodiment of this application.

D2D communication is classified into three scenarios: in coverage, partial coverage, and out of coverage. As shown in FIG. 2, in an in-coverage scenario, UE is in coverage of a base station; in a partial-coverage scenario, some UEs are in coverage area of a base station, and other UEs are not in the coverage of the base station; in an out-of-coverage scenario, all UEs are out of coverage of a base station. If UE can listen to a signal of the base station, the UE is UE in network coverage. If UE can listen to a signal of another UE in network coverage, the UE is UE in partial network coverage. If UE cannot receive either of the two types of signals, the UE is UE out of network coverage.

Manner 2: The first device obtains the at least one parameter by using a signal sent by a second device.

For example, if the second device is a communications device in network coverage, the second device can receive the at least one parameter that is configured by a base station and that affects the transmit power, and send the at least one parameter to the first device, so that the first device obtains the at least one parameter. Preferably, this manner is applicable to a scenario in which the first device is a communications device in partial network coverage.

Manner 3: The first device obtains the at least one parameter by using a signal sent by a synchronization source.

For example, the synchronization source receives the at least one parameter that is configured by a base station and that affects the transmit power, and sends the at least one parameter to the first device, so that the first device obtains the at least one parameter. Preferably, this manner is applicable to a scenario in which the first device is a communications device in partial coverage and a scenario in which the first device is a communications device out of coverage.

Manner 4: The first device obtains the at least one parameter by means of preconfiguration.

In this manner, the at least one parameter that affects the transmit power is a preconfigured parameter. This manner is applicable to a scenario in which the first device is a communications device in network coverage, a scenario in which the first device is a communications device in partial network coverage, and a scenario in which the first device is a communications device out of network coverage.

Based on any one of the foregoing embodiments, the first transmit power parameter includes at least one of an open-loop power parameter. The open-loop power parameter includes at least one of the following parameters: an open-loop power control parameter, a path loss compensation coefficient, a path loss, maximum transmit power, or a power compensation value.

Optionally, the first transmit power parameter further includes at least one of a closed-loop power parameter. The closed-loop power parameter includes a closed-loop power control adjustment value.

Optionally, if the first transmit power parameter determined by the first device includes some of transmit power parameters used to calculate the transmit power, that the first device determines the transmit power according to the first transmit power parameter includes determining, by the first device, the transmit power according to the first transmit power parameter and a second transmit power parameter, where the second transmit power parameter includes a parameter except the first transmit power parameter in the parameters that are used to calculate the transmit power.

Optionally, the method further includes: obtaining, by the first device, the second transmit power parameter by means of configuration by the base station; or obtaining, by the first device, the second transmit power parameter by using a signal sent by the second device; or obtaining, by the first device, the second transmit power parameter by using a signal sent by the synchronization source; or obtaining, by the first device, the second transmit power parameter by means of preconfiguration.

For example, a sum of the first transmit power parameter and the second transmit power parameter includes all parameters required for calculating the transmit power. Assuming that the first transmit power parameter includes the open-loop power control parameter, the path loss compensation coefficient, and the path loss, the second transmit power parameter includes the maximum transmit power and the power compensation value. The first device determines the transmit power according to the first transmit power parameter and the second transmit power parameter.

Optionally, the method further includes: determining, by the first device, a path loss between the first device and a specified device.

That the first device determines the transmit power according to the first transmit power parameter further includes: determining, by the first device, the transmit power according to the path loss.

In this embodiment of this application, in a first optional manner, the specified device includes: the synchronization source; or UE that is closest to the first device and is in network coverage, or UE that is farthest from the first device and is in network coverage, or UE that has a smallest signal measurement value in network coverage, or UE that has a largest signal measurement value in network coverage, or UE that has a smallest signal measurement value in UE whose signal measurement value falls within a specified threshold range in network coverage, or UE that has a largest signal measurement value in UE whose signal measurement value falls within a specified threshold range in network coverage; or UE, in a neighboring device of the first device, that is farthest from the first device and supports a device-to-device D2D function, or UE that is closest to the first device and supports a D2D function, or UE that has a largest signal measurement value and supports a D2D function, or UE that has a smallest signal measurement value and supports a D2D function, or UE that supports a D2D function and has a largest signal measurement value in UE, in a neighboring device of the first device, whose signal measurement value falls within a specified threshold range, or UE that supports a D2D function and has a smallest signal measurement value in UE, in a neighboring device of the first device, whose signal measurement value falls within a specified threshold range; or UE, in a neighboring device of the first device, that is farthest from the first device and supports an Internet of Vehicles function (that is, V2X), or UE that is closest to the first device and supports an Internet of Vehicles function, or UE that has a largest signal measurement value and supports an Internet of Vehicles function, or UE that has a smallest signal measurement value and supports an Internet of Vehicles function, or UE that supports an Internet of Vehicles function and has a largest signal measurement value in UE whose signal measurement value falls within a specified threshold range, or UE that supports an Internet of Vehicles function and has a smallest signal measurement value in UE whose signal measurement value falls within a specified threshold range; or an RSU closest to the first device, or an RSU farthest from the first device, or an RSU that has a smallest signal measurement value, or an RSU that has a largest signal measurement value, or an RSU that has a smallest signal measurement value in an RSU whose signal measurement value falls within a specified threshold range, or an RSU that has a largest signal measurement value in an RSU whose signal measurement value falls within a specified threshold range; or a mobile terminal closest to the first device, or a mobile terminal farthest from the first device in a neighboring device of the first device, or a mobile terminal that has a smallest signal measurement value, or a mobile terminal that has a largest signal measurement value, or a mobile terminal that has a smallest signal measurement value in a mobile terminal whose signal measurement value falls within a specified threshold range, or a mobile terminal that has a largest signal measurement value in a mobile terminal whose signal measurement value falls within a specified threshold range.

In this embodiment, the neighboring device of the first device is at least one communications device in a communication range of the first device.

In this embodiment, the specified threshold range may be specified according to experience or simulation or an application environment.

Figure 3:
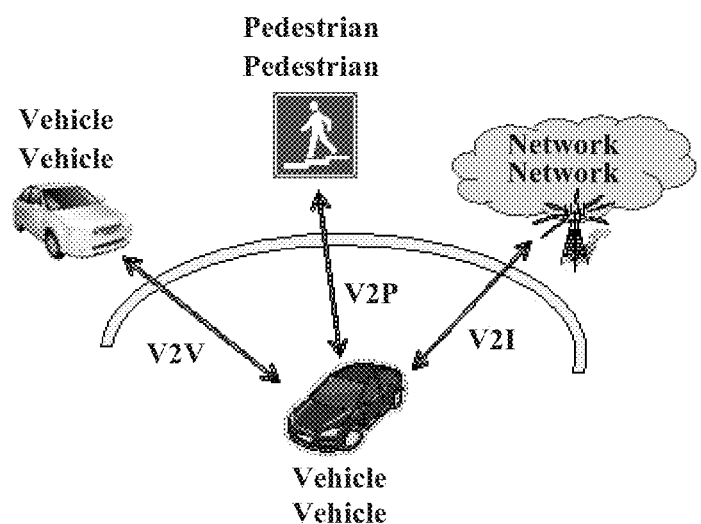
FIG. 3 is a schematic diagram of V2X communication according to an embodiment of this application.

V2X is a main application of a D2D technology. A specific application requirement of V2X is optimized on a basis of the existing D2D technology, so as to further reduce an access delay of a V2X device and resolve a resource conflict problem. As shown in FIG. 3, V2X specifically includes three application requirements: V2V, V2P, and V2I/N. V2V is LTE-based vehicle-to-vehicle communication. V2P is LTE-based vehicle-to-pedestrian (including a pedestrian, a person riding a bicycle, a driver, or a passenger) communication. V2I is LTE-based vehicle-to-roadside unit (RSU) communication. In addition, V2I may further include another type of V2N. V2N is LTE-based vehicle-to-base station/network communication. A roadside unit (RSU) includes two types: a terminal-type RSU and a base station-type RSU. Because the terminal-type RSU is deployed on a roadside, the terminal-type RSU is in a non-movement state, and mobility does not need to be considered. The base station-type RSU can provide timing synchronization and resource scheduling for a vehicle that communicates with the base station-type RSU.

Optionally, the signal measurement value includes at least one of reference signal received power (RSRP), reference signal received quality (RSRQ), a received signal strength indicator (Received Signal Strength Indication, RSSI), a signal to interference plus noise ratio (SINR), or a channel quality indicator (CQI).

In a second optional manner, the specified device is a communications device specified by the base station.

For example, the base station specifies the specified device, and sends, by means of broadcast, information used to identify the specified device.

In a third optional manner, the specified device is a communications device determined by the first device according to a predefined rule.

During implementation, the predefined rule may be determining the specified device according to an arithmetic average value, or may be determining the specified device according to a geometric average value, or the like. A specific rule is not limited in this embodiment of this application.

For example, assuming that the first device can detect signals of M nearby UEs (numbered UE 1, UE 2, ..., and UE M) in total, the $$\lfloor \frac{M}{2} \rfloor$$

th UE is determined as the specified device, and the function $\lfloor \ \rfloor$ means round-down to the nearest integer.

For example, assuming that the first device determines that distances between the first device and the UE 1, the UE 2, and the UE 3 that are in network coverage are respectively L1, L2, and L3, the arithmetic average value is calculated as follows: L=(L1+L2+L3)/3. In this case, $\Delta 1=|L1-L|$, $\Delta 2=|L2-L|$, and $\Delta 3=|L3-L|$ are first separately determined, then a minimum value is determined from $\Delta 1$, $\Delta 1$, and $\Delta 3$, and finally, UE corresponding to the minimum value is determined as the specified device.

For example, assuming that the first device determines that distances between the first device and the UE 1, the UE 2, and the UE 3 that are in network coverage are respectively L1, L2, and L3, the geometric average value is calculated as follows: $L=\sqrt[3]{L1 \cdot L2 \cdot L3}$. In this case, $\Delta 1=|L1-L|$, $\Delta 2=|L2-L|$, and $\Delta 3=|L3-L|$ are first separately determined, then a minimum value is determined from $\Delta 1$, $\Delta 1$, and $\Delta 3$, and finally, UE corresponding to the minimum value is determined as the specified device.

Based on any one of the foregoing embodiments, the data sent by the first device in S13 includes at least one of control signaling, service data, a reference signal, a broadcast signal, or a synchronization signal.

Embodiment 2

Figure 4:
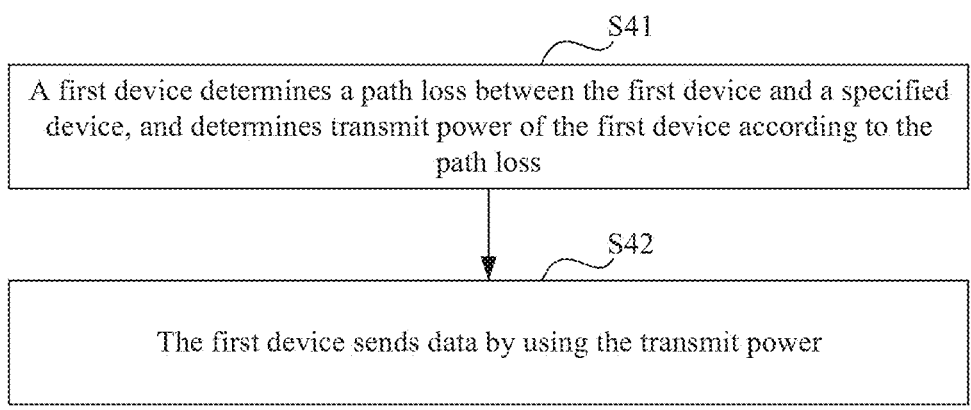
FIG. 4 is a schematic flowchart of a second data sending method according to an embodiment of this application.

This embodiment provides another data sending method. As shown in FIG. 4, the method includes the following steps.

Step S41. A first device determines a path loss between the first device and a specified device, and determines transmit power of the first device according to the path loss.

Step S42. The first device sends data by using the transmit power.

In this embodiment, the first device determines the path loss between the first device and the specified device, and determines the transmit power of the first device according to the path loss. Because the path loss is the path loss between the first device and the specified device, the transmit power determined based on the path loss is more appropriate.

The specified device in this embodiment is the same as that in Embodiment 1 shown in FIG. 1, a signal measurement value in this embodiment is the same as that in Embodiment 1 shown in FIG. 1, and the data sent by the first device in this embodiment is the same as that in Embodiment 1 shown in FIG. 1. For details, refer to descriptions in Embodiment 1. Details are not described herein again.

In this embodiment, other power parameters than the path loss, such as an open-loop power control parameter, a path loss compensation coefficient, maximum transmit power, and a power compensation value, may be obtained by the first device by means of configuration by a base station, or may be obtained by using a signal sent by a second device, or may be obtained by using a signal sent by a synchronization source, or may be obtained by means of preconfiguration.

Embodiment 3

Figure 5:
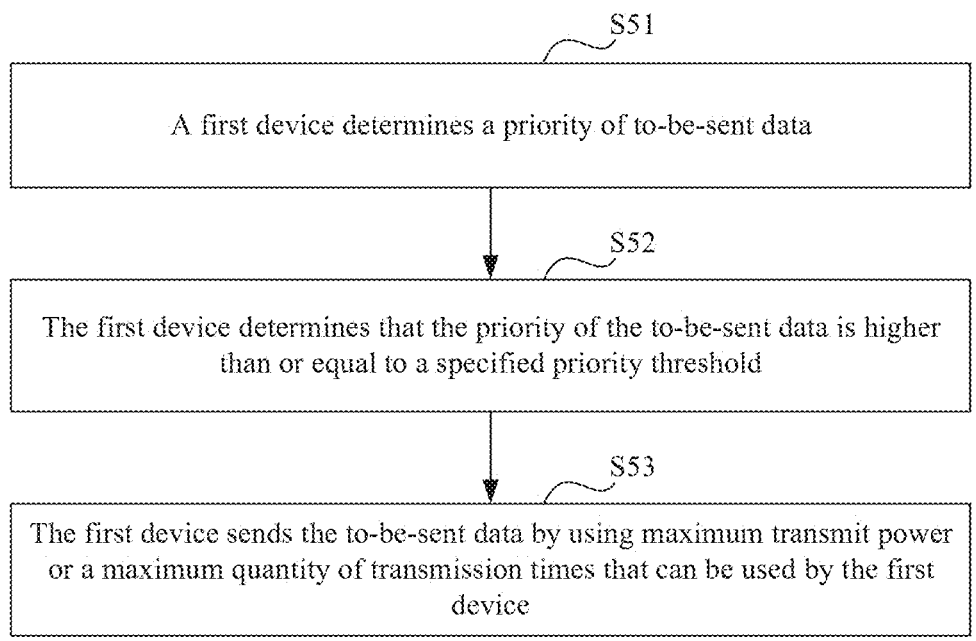
FIG. 5 is a schematic flowchart of a third data sending method according to an embodiment of this application.

This embodiment provides another data sending method. As shown in FIG. 5, the method includes the following steps.

Step S51. A first device determines a priority of to-be-sent data.

Step S52. The first device determines that the priority of the to-be-sent data is higher than or equal to a specified priority threshold.

Step S53. The first device sends the to-be-sent data by using maximum transmit power or a maximum quantity of transmit times that can be used by the first device.

In this embodiment, after determining that the priority of the to-be-sent data is higher than or equal to the specified priority threshold, the first device sends the to-be-sent data by using the maximum transmit power or the maximum quantity of transmit times that can be used by the first device. Because the first device always uses the maximum transmit power or the maximum quantity of transmit times when sending an emergency service, sending of a service with a highest priority is ensured.

In this embodiment, the specified priority threshold may be specified according to experience or simulation or an application environment.

Optionally, the to-be-sent data is data of the first device or data that is sent by a second device and that is received by the first device.

During implementation, if the to-be-sent data is the data that is sent by the second device and that is received by the first device, that the first device sends the to-be-sent data in step S52 further includes when the first device determines that a forwarding hop count of the received data sent by the second device is less than or equal to a specified first threshold, forwarding, by the first device, the received data sent by the second device; and/or when the first device determines that a quantity of processes that are currently processed in parallel by the first device is less than or equal to a specified second threshold, forwarding, by the first device, the received data sent by the second device.

The forwarding hop count of the data is a value that is counted starting from a data source. Each time the data is forwarded, the forwarding hop count of the data is increased by 1. The quantity of processes that are processed in parallel is a quantity of data processes that can be simultaneously processed by a communications device under a limitation of a processing capability of the communications device.

In this embodiment of this application, both the specified first threshold and the specified second threshold may be specified according to experience or simulation or an application environment.

Optionally, when the first device determines that the forwarding hop count carried in the received data sent by the second device is greater than the first threshold, the first device does not send the received data sent by the second device.

Optionally, when the first device determines that the quantity of processes that are currently processed in parallel by the first device is greater than the second threshold, the first device does not send the received data sent by the second device.

In this embodiment, after the first device determines the priority of the to-be-sent data, the method further includes: determining, by the first device, that the priority of the to-be-sent data is lower than the specified threshold; and sending, by the first device, the to-be-sent data by using transmit power less than the maximum transmit power of the first device or by using a quantity of transmit times less than the maximum quantity of transmit times.

For example, if the first device determines that the priority of the to-be-sent data is lower than the specified threshold, the first device subtracts a specified power step from the maximum transmit power of the first device, and sends the to-be-sent data by using transmit power obtained by means of calculation.

If the first device determines that the priority of the to-be-sent data is lower than the specified threshold, the first device subtracts a specified step (for example, 1) of a quantity of times from the maximum quantity of transmit times of the first device, and sends the to-be-sent data by using transmit power obtained by means of calculation.

The foregoing method processing procedure may be implemented by using a software program. The software program may be stored in a storage medium. When the stored software program is invoked, the foregoing method steps are performed.

Based on a same application idea, an embodiment of this application further provides a data sending device. A principle of resolving a problem by the device is similar to that of the data sending method shown in FIG. 1. Therefore, for an implementation of the device, refer to an implementation of the method. No repeated description is provided.

Embodiment 4

Figure 6:
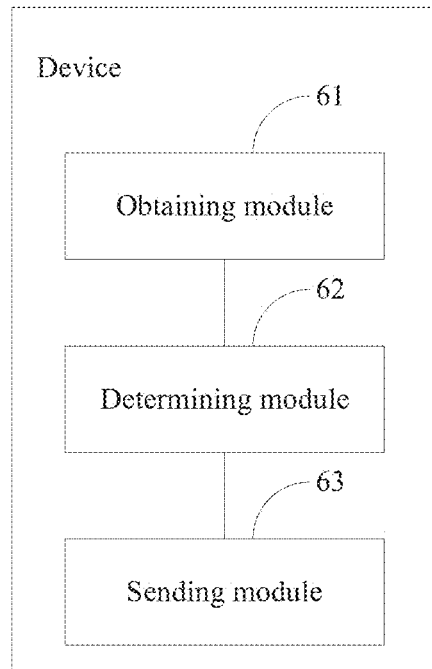
FIG. 6 is a schematic diagram of a first data sending device according to an embodiment of this application.

This embodiment provides a data sending device. As shown in FIG. 6, the device includes: an obtaining module 61, configured to obtain at least one parameter used to determine transmit power; a determining module 62, configured to determine the transmit power according to the at least one parameter; and a sending module 63, configured to send data by using the transmit power.

The at least one parameter includes at least one of the following parameters: a resource pool used for data transmission, a type of a to-be-sent message or service, a transmit interval or a transmit frequency of a to-be-sent message or service, a size of a message packet, a priority of a to-be-sent message or service, an identity ID of a to-be-sent message or service, an ID of a transmit end, an ID of a receive end, a type of a transmit end, or a type of a receive end.

In this embodiment, when determining the transmit power of the first device to which the determining module belongs, the determining module considers at least one parameter that affects the transmit power, and determines the transmit power of the first device according to the at least one parameter used to determine the transit power. Because impact of another factor on the transmit power is considered, the determined transmit power is more appropriate.

In this embodiment, different at least one parameters correspond to different transmit power, or different at least one parameters correspond to different first transmit power parameters.

Optionally, if different at least one parameters correspond to different first transmit power parameters, the determining module 62 determines, according to the at least one parameter, a first transmit power parameter corresponding to the at least one parameter, and determines the transmit power according to the first transmit power parameter.

Optionally, the obtaining module 61 may obtain the at least one parameter by means of configuration by a base station, or obtain the at least one parameter by using a signal sent by a second device, or obtain the at least one parameter by using a signal sent by a synchronization source, or obtain the at least one parameter by means of preconfiguration.

The first transmit power parameter in this embodiment is the same as that in Embodiment 1 shown in FIG. 1. For details, refer to descriptions in Embodiment 1. Details are not described herein again.

Based on any one of the foregoing embodiments, if the first transmit power parameter that is determined by the determining module 62 and that is corresponding to the at least one parameter includes some of parameters used to calculate the transmit power, optionally, when determining the transmit power, the determining module 62 determines the transmit power according to the first transmit power parameter and a second transmit power parameter. The second transmit power parameter includes a parameter except the first transmit power parameter in the parameters that are used to calculate the transmit power.

The obtaining module 61 may obtain the second transmit power parameter by means of configuration by the base station, or may obtain the second transmit power parameter by using a signal sent by the second device, or may obtain the second transmit power parameter by using a signal sent by the synchronization source, or may obtain the second transmit power parameter by means of preconfiguration.

Based on any one of the foregoing embodiments, before determining the transmit power, the determining module 62 determines a path loss between the first device to which the determining module 62 belongs and a specified device. When determining the transmit power, the determining module 62 determines the transmit power according to the first transmit power parameter and the path loss.

The specified device in this embodiment is the same as that in Embodiment 1 shown in FIG. 1, a signal measurement value in this embodiment is the same as that in Embodiment 1 shown in FIG. 1, and the data sent by the sending module in this embodiment is the same as the data sent by the first device in Embodiment 1 shown in FIG. 1. For details, refer to descriptions in Embodiment 1. Details are not described herein again.

Based on a same application idea, an embodiment of this application further provides another data sending device. A principle of resolving a problem by the device is similar to that of the data sending method shown in FIG. 4. Therefore, for an implementation of the device, refer to an implementation of the method. No repeated description is provided.

Embodiment 5

Figure 7:
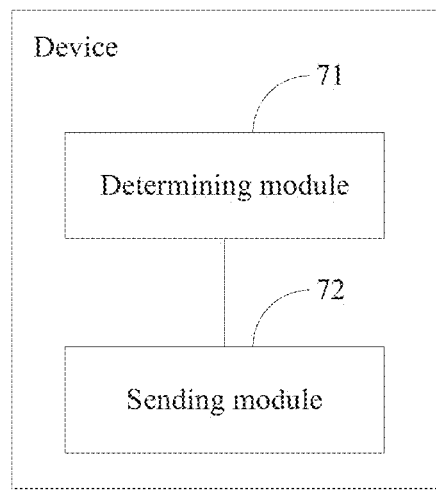
FIG. 7 is a schematic diagram of a second data sending device according to an embodiment of this application.

This embodiment provides another data sending device. As shown in FIG. 7. The device includes a determining module 71, configured to: determine a path loss between the first device to which the determining module 71 belongs and a specified device, and determine transmit power of the first device according to the path loss. The device includes a sending module 72, configured to send data by using the transmit power by the first device.

In this embodiment, when determining the transmit power of the first device to which the determining module belongs, the determining module first determines the path loss between the first device and the specified device, and determines the transmit power of the first device according to the path loss. Because the path loss is the path loss between the first device and the specified device, the transmit power determined based on the path loss is more appropriate.

The specified device in this embodiment is the same as that in Embodiment 1 shown in FIG. 1, a signal measurement value in this embodiment is the same as that in Embodiment 1 shown in FIG. 1, and the data sent by the sending module in this embodiment is the same as the data sent by the first device in Embodiment 1 shown in FIG. 1. For details, refer to descriptions in Embodiment 1. Details are not described herein again.

Based on a same application idea, an embodiment of this application further provides another data sending device. A principle of resolving a problem by the device is similar to that of the data sending method shown in FIG. 5. Therefore, for an implementation of the device, refer to an implementation of the method. No repeated description is provided.

Embodiment 6

Figure 8:
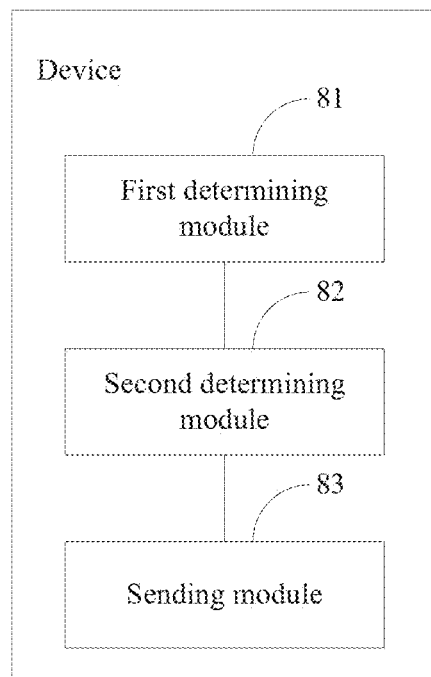
FIG. 8 is a schematic diagram of a third data sending device according to an embodiment of this application.

This embodiment provides another data sending device. As shown in FIG. 8. The device includes a first determining module 81, configured to determine a priority of to-be-sent data. The device includes a second determining module 82, configured to determine that the priority of the to-be-sent data is higher than or equal to a specified priority threshold. The device includes a sending module 83, configured to send the to-be-sent data by using maximum transmit power or a maximum quantity of transmit times that can be used by the first device to which the sending module 83 belongs.

In this embodiment, after determining that the priority of the to-be-sent data is higher than or equal to the specified priority threshold, the second determining module controls the sending module to send the to-be-sent data by using the maximum transmit power or the maximum quantity of transmit times that can be used by the first device. Because the first device always uses the maximum transmit power or the maximum quantity of transmit times when sending an emergency service, sending of a service with a highest priority is ensured.

Optionally, the to-be-sent data is data of the first device or data that is sent by a second device and that is received by the first device.

Further, if the to-be-sent data is the data that is sent by the second device and that is received by the first device, when the second determining module 82 determines that a forwarding hop count of the received data sent by the second device is less than or equal to a specified first threshold, and/or a quantity of processes that are currently processed in parallel by the first device is less than or equal to a specified second threshold, the second determining module 82 controls the sending module to forward the received data sent by the second device.

Based on any one of the foregoing embodiments, when determining that the priority of the to-be-sent data is lower than the priority threshold, the second determining module 82 controls the sending module 83 to send the to-be-sent data by using transmit power less than the maximum transmit power of the first device or by using a quantity of transmit times less than the maximum quantity of transmit times.

The data sending device provided in this embodiment of this application may be a data sending device in a D2D system. The following describes a hardware structure of the data sending device.

Figure 9:
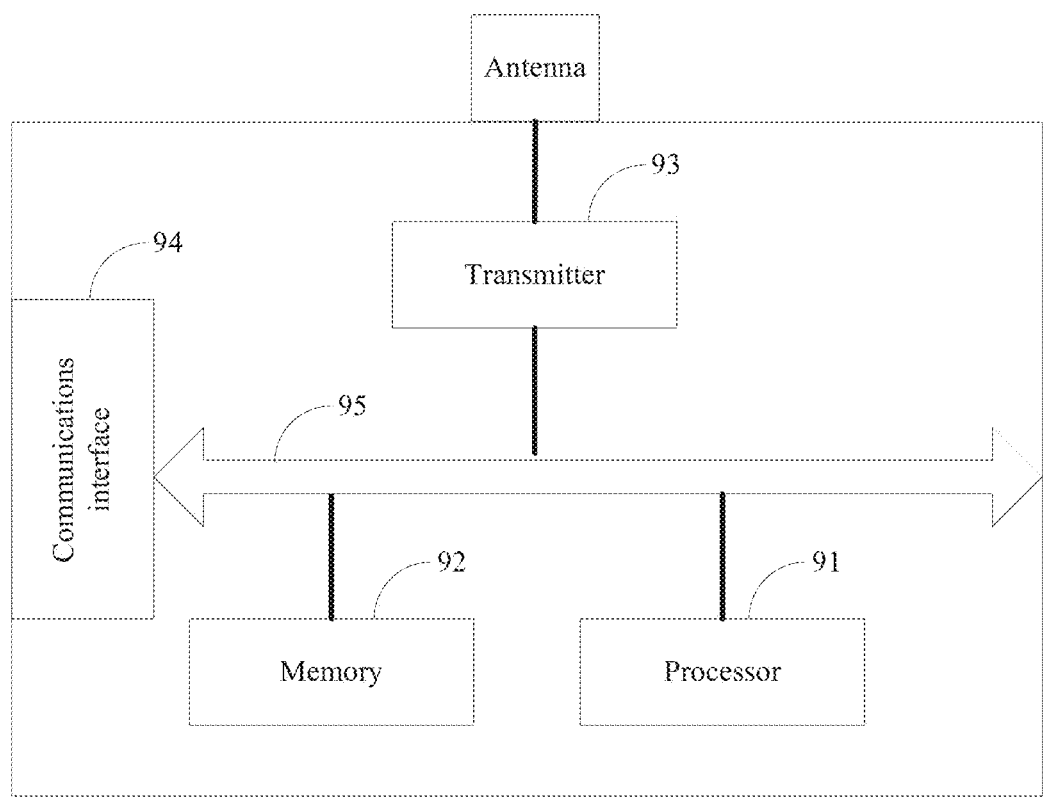
FIG. 9 is a schematic diagram of a fourth data sending device according to an embodiment of this application.

An embodiment provides another data sending device. As shown in FIG. 9, the device includes: a processor 91, a memory 92, a transmitter 93, a communications interface 94, and a system bus 95.

The processor 91 connects to and communicates with the communications interface 94 by using the system bus 95. The processor 91 may be a central processing unit (CPU), or an application-specific integrated circuit (ASIC), or one or more integrated circuits that are configured to implement this embodiment of this application.

The communications interface 94 is configured to interact with another communications device.

The transmitter 93 is configured to transmit data under control of the processor 91.

The memory 92 may store data used when the processor 91 performs an operation.

When the data sending device needs to send data, the following three optional implementations are included:

Embodiment 7

The processor 91 reads a program in the memory 92, to implement functions of the obtaining module 61 and the determining module 62 in Embodiment 4. The transmitter 93 in this embodiment implements, under control of the processor 91, a function of the sending module 63 in Embodiment 4. For details, refer to descriptions in Embodiment 4. Details are not described herein again.

Embodiment 8

The processor 91 reads a program in the memory 92, to implement a function of the determining module 71 in Embodiment 5. The transmitter 93 in this embodiment implements, under control of the processor 91, a function of the sending module 72 in Embodiment 5. For details, refer to descriptions in Embodiment 5. Details are not described herein again.

Embodiment 9

The processor 91 reads a program in the memory 92, to implement functions of the first determining module 81 and the second determining module 82 in Embodiment 6. The transmitter 93 in this embodiment implements, under control of the processor 91, a function of the sending module 83 in Embodiment 6. For details, refer to descriptions in Embodiment 6. Details are not described herein again.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method comprising:
    obtaining, by a first device, at least one parameter for determining transmit power, wherein the at least one parameter comprises a priority of a to-be-sent message or a priority of a service;
    determining, by the first device, a first transmit power parameter corresponding to the at least one parameter;
    determining, by the first device, the transmit power according to the first transmit power parameter, the first transmit power parameter comprises a maximum transmit power; and
    sending, by the first device, data corresponding to the to-be-sent message or the service according to the transmit power determined according to the first transmit power parameter.

2. The method according to claim 1, wherein the obtaining, by a first device, the at least one parameter for determining transmit power comprises:
    obtaining, by the first device, the at least one parameter by configuration from a base station.

3. The method according to claim 1, wherein the data comprises at least one of: control signaling, service data, a reference signal, a broadcast signal, or a synchronization signal.

4. A device comprising:
    a processor; and
    a non-transitory computer readable storage medium storing programming for execution by the processor, the programming including instructions to:
        obtain at least one parameter for determining transmit power, wherein the at least one parameter comprises a priority of a to-be-sent message or a priority of a service;
        determine a first transmit power parameter corresponding to the at least one parameter;
        determine the transmit power according to the first transmit power parameter, the first transmit power parameter comprises a maximum transmit power; and
        send data corresponding to the to-be-sent message or the service according to the transmit power determined according to the first transmit power parameter.

5. The device according to claim 4, wherein the instructions comprise further instructions to:
    obtain the at least one parameter by configuration from a base station.

6. The device according to claim 4, wherein the data comprises at least one of: control signaling, service data, a reference signal, a broadcast signal, or a synchronization signal.

7. A non-transitory computer-readable media storing computer instructions that when executed by one or more processors, cause the one or more processors to perform the steps of:
    obtaining, by a first device, at least one parameter for determining transmit power, wherein the at least one parameter comprises a priority of a to-be-sent message or a service;
    determining a first transmit power parameter corresponding to the at least one parameter;
    determining the transmit power according to the first transmit power parameter, the first transmit power parameter comprises a maximum transmit power; and
    sending data corresponding to the to-be-sent message or the service according to the transmit power determined according to the first transmit power parameter.

8. The non-transitory computer-readable media according to claim 7, wherein the steps further comprises:
    obtaining the at least one parameter by configuration from a base station.

9. The non-transitory computer-readable media according to claim 7, wherein the data comprises at least one of: control signaling, service data, a reference signal, a broadcast signal, or a synchronization signal.

* * * * *